United States Patent
Lee et al.

(10) Patent No.: US 8,689,288 B2
(45) Date of Patent: *Apr. 1, 2014

(54) APPARATUS AND METHOD FOR PROTECTING SYSTEM IN VIRTUALIZED ENVIRONMENT

(75) Inventors: Sung-Min Lee, Suwon-si (KR); Bok-Deuk Jeong, Yongin-si (KR); Sang-Bum Suh, Seoul (KR); Sang-Dok Mo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

This patent is subject to a terminal disclaimer.

(21) Appl. No.: 12/034,178

(22) Filed: Feb. 20, 2008

(65) Prior Publication Data
US 2008/0256599 A1    Oct. 16, 2008

Related U.S. Application Data

(60) Provisional application No. 60/911,930, filed on Apr. 16, 2007.

(30) Foreign Application Priority Data

Oct. 31, 2007    (KR) .................... 10-2007-0110296

(51) Int. Cl.
G06F 7/04    (2006.01)

(52) U.S. Cl.
USPC .................................... 726/2; 726/7

(58) Field of Classification Search
USPC ............................... 726/2, 27, 34
See application file for complete search history.

(56) References Cited

U.S. PATENT DOCUMENTS

| 6,636,901 | B2 * | 10/2003 | Sudhakaran et al. | 719/327 |
| 7,305,534 | B2 | 12/2007 | Watt et al. | |
| 7,525,967 | B2 | 4/2009 | Vasudevan et al. | |
| 7,743,038 | B1 * | 6/2010 | Goldick | 707/694 |
| 7,757,231 | B2 | 7/2010 | Anderson et al. | |
| 7,765,545 | B2 | 7/2010 | Uchishiba et al. | |
| 7,783,769 | B2 | 8/2010 | Vasudevan et al. | |
| 7,788,391 | B2 | 8/2010 | Sen et al. | |
| 7,865,893 | B1 * | 1/2011 | Omelyanchuk et al. | 718/1 |

(Continued)

FOREIGN PATENT DOCUMENTS

| EP | 1 730 919 A0 | 11/2005 |
| EP | 1 839 142 A0 | 6/2006 |

(Continued)

OTHER PUBLICATIONS

Fraser et al., Safe Hardware Access with the Xen Virtual Machine, 1st workshop on operating system and architectural support for the on demand IT infrastructure (OASIS), Oct. 2004.*

(Continued)

*Primary Examiner* — Teshome Hailu
(74) *Attorney, Agent, or Firm* — Sughrue Mion, PLLC

(57) ABSTRACT

Provided is an apparatus and method for protecting a system in a virtualized environment. The apparatus includes a domain unit including a plurality of domains, each having one or more device drivers; a system resource unit forming hardware of the system; a direct memory access (DMA) driver; and a control unit including an access control module which controls the access of the domain unit to the system resource unit in the virtualized environment.

17 Claims, 5 Drawing Sheets

(56) References Cited

U.S. PATENT DOCUMENTS

| | | | |
|---|---|---|---|
| 8,121,125 | B2 | 2/2012 | Vasudevan et al. |
| 8,238,360 | B2 | 8/2012 | Cornett et al. |
| 2002/0016812 | A1 | 2/2002 | Uchishiba et al. |
| 2003/0187904 | A1* | 10/2003 | Bennett et al. ............... 709/1 |
| 2004/0143664 | A1 | 7/2004 | Usa et al. |
| 2004/0177261 | A1 | 9/2004 | Watt et al. |
| 2004/0205203 | A1* | 10/2004 | Peinado et al. ............. 709/229 |
| 2005/0223128 | A1 | 10/2005 | Vasudevan et al. |
| 2005/0223133 | A1 | 10/2005 | Sen et al. |
| 2005/0223134 | A1 | 10/2005 | Vasudevan et al. |
| 2005/0235123 | A1* | 10/2005 | Zimmer et al. ............ 711/170 |
| 2005/0238019 | A1 | 10/2005 | Vasudevan et al. |
| 2006/0005198 | A1 | 1/2006 | Uchishiba et al. |
| 2006/0072564 | A1 | 4/2006 | Cornett et al. |
| 2006/0130060 | A1 | 6/2006 | Anderson et al. |
| 2006/0136612 | A1* | 6/2006 | Aslot et al. ..................... 710/22 |
| 2006/0136720 | A1* | 6/2006 | Armstrong et al. .......... 713/164 |
| 2006/0256107 | A1* | 11/2006 | Scarlata et al. ............... 345/418 |
| 2007/0043896 | A1* | 2/2007 | Daruwala et al. ................ 711/6 |
| 2007/0043943 | A1* | 2/2007 | Peretti ........................... 713/167 |
| 2007/0083862 | A1* | 4/2007 | Wooldridge et al. ............. 718/1 |
| 2007/0133044 | A1* | 6/2007 | Tanaka ......................... 358/1.15 |
| 2007/0156968 | A1* | 7/2007 | Madukkarumukumana et al. ............................... 711/138 |
| 2007/0245348 | A1* | 10/2007 | Araujo et al. ..................... 718/1 |
| 2007/0261120 | A1* | 11/2007 | Arbaugh et al. ................ 726/26 |
| 2007/0300223 | A1* | 12/2007 | Liu .................................... 718/1 |
| 2008/0005297 | A1* | 1/2008 | Kjos et al. ..................... 709/223 |
| 2008/0244758 | A1* | 10/2008 | Sahita et al. ..................... 726/34 |
| 2008/0294808 | A1* | 11/2008 | Mahalingam et al. .......... 710/26 |
| 2009/0328074 | A1* | 12/2009 | Oshins ........................... 719/321 |
| 2011/0197256 | A1* | 8/2011 | Sharkey et al. .................... 726/1 |

FOREIGN PATENT DOCUMENTS

| | | |
|---|---|---|
| EP | 1 730 919 B1 | 3/2009 |
| JP | 2002-41304 A | 2/2002 |
| JP | 2002-318701 A | 10/2002 |
| JP | 2004-199561 A | 7/2004 |
| JP | 2006-506754 A | 2/2006 |
| JP | 2007-528074 A | 10/2007 |
| JP | 2008-523511 A | 7/2008 |
| WO | 2005/104486 A1 | 11/2005 |
| WO | 2006/063274 A1 | 6/2006 |

OTHER PUBLICATIONS

Barham et al., Xen and the art of virtualization, SOSP'03, Oct. 2003.*
Communication dated Dec. 30, 2010, issued in corresponding European Patent Application No. 08153591.6.
Communication, dated Jan. 29, 2013, issued by the Japanese Patent Office in counterpart Japanese Patent Application No. 2008-074946.
Communication dated Oct. 28, 2013 issued by the Korean Intellectual Property Office in counterpart Korean Patent Application No. 10-2007-0110296.

* cited by examiner

APPARATUS AND METHOD FOR PROTECTING SYSTEM IN VIRTUALIZED ENVIRONMENT

This application claims priority from U.S. Provisional Application No. 60/911,930, filed on Apr. 16, 2007 in the United States Patent and Trademark Office, and Korean Patent Application No. 10-2007-0110296, filed on Oct. 31, 2007 in the Korean Intellectual Property Office, the disclosure of which are incorporated herein by reference in their entirety.

BACKGROUND OF THE INVENTION

1. Field of the Invention

Apparatuses and methods consistent with the present invention relate to system protection, and more particularly, to protecting a system in a virtualized environment, in which system resources are protected from malicious access and safe security services are guaranteed in the virtualized environment.

2. Description of the Related Art

Generally, devices such as personal computers (PCs), personal digital assistants (PDAs), wireless terminals and digital televisions (DTVs) use virtualization technology to enhance security and implement various applications and services. In order to provide a secure environment, the virtualization technology requires functions such as secure boot, secure software, and access control.

FIG. 1 is a block diagram of a related virtualization system apparatus. Referring to FIG. 1, the related virtualization system apparatus uses a virtual machine monitor (VMM) 10 to create a virtualized environment. The related virtualization system apparatus includes a domain unit 20 having a plurality of domains 21, 22, . . . and a system resource unit 30 having a read-only memory (ROM), a central processing unit (CPU), a memory, a battery and an input/output (I/O) device.

Each of the domains 21, 22, . . . of the domain unit 20 includes one or more device drivers 21a, 22a, or . . . . In addition, at least one of the domains 21, 22, . . . , for example, domain 21, includes a direct memory access (DMA) driver 21b. In the related virtualization system apparatus, the domain unit 20 processes DMA, and there is no limit to the formation of channels between the domains 21, 22, . . . . In addition, the domain unit 20 or the VMM 10 performs simple access control when each of the domains 21, 22, . . . attempts to access the system resource unit 30.

However, the above related virtualization system apparatus has security problems because the domain unit 20 processes DMA and the VMM 10 does not perform access control for preventing the possible malicious access of the domain unit 20 to the system resource unit 30.

More specifically, the domain 21 processes DMA, and access to a physical memory is not controlled. Therefore, if there is an insecure domain or a domain including a device driver with a bug, the domain may access a physical memory of the VMM 10 or another domain and steal confidential data or overwrite dummy data, thereby causing system failures.

If a specific domain excessively uses a system memory, system failures may occur, which, in turn, reduces system availability.

The number of event channels that can be formed between two domains is limited. Therefore, if a malicious domain uses all the available event channels, no event channel can be formed between the remaining domains. Consequently, system failures may occur.

SUMMARY OF THE INVENTION

Aspects of the present invention provide an apparatus and method for protecting a system in a virtualized environment, in which system resources are protected from malicious access by, for example, malware, system failures are solved, and safe security services are guaranteed in the virtualized environment.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for protecting a system in a virtualized environment. The apparatus includes a domain unit including a plurality of domains, each having one or more device drivers; a system resource unit forming hardware of the system; a direct memory access (DMA) driver; and a control unit including an access control module which controls the access of the domain unit to the system resource unit in the virtualized environment.

According to another aspect of the present invention, there is provided a method of protecting a system in a virtualized environment. The method includes requesting an access control module to allocate an input/output (I/O) space and an interrupt request (IRQ) number, which are required to access a system resource unit, to a device driver in one of a plurality of domains; determining whether a predetermined access control policy allows the domain executing the device driver to access the system resource unit; and allocating the requested I/O space and the IRQ number to the device driver in the domain if the predetermined access control policy allows the domain to access the system resource unit, and not allocating the requested I/O space and the IRQ number to the device driver in the domain if the predetermined access control policy does not allow the domain to access the system resource unit.

According to another aspect of the present invention, there is provided a method of protecting a system in a virtualized environment. The method includes requesting an access control module to allow access to a memory of a system resource unit through a DMA driver by using a device driver in one of a plurality of domains; determining whether a predetermined access control policy allows the domain executing the device driver to access the memory; and allowing the device driver in the domain to access the memory if the predetermined access control policy allows the domain to access the memory, and not allowing the device driver in the domain to access the memory if the predetermined access control policy does not allow the domain to access the memory.

According to another aspect of the present invention, there is provided a method of protecting a system in a virtualized environment. The method includes requesting an access control module to allocate system resources using one of a plurality of domains; determining whether the amount of system resources requested by the domain exceeds an allowed quota set by a predetermined access control policy; and allowing the allocation of the requested system resources to the domain if the amount of system resources requested by the domain is less than the allowed quota, and not allowing the allocation of the requested system resources to the domain if the amount of system resources requested by the domain exceeds the allowed quota.

BRIEF DESCRIPTION OF THE DRAWINGS

The above and other aspects of the present invention will become more apparent by describing certain exemplary embodiments of the present invention with reference to the accompanying drawings, in which.

DETAILED DESCRIPTION OF THE INVENTION

Figure 1:
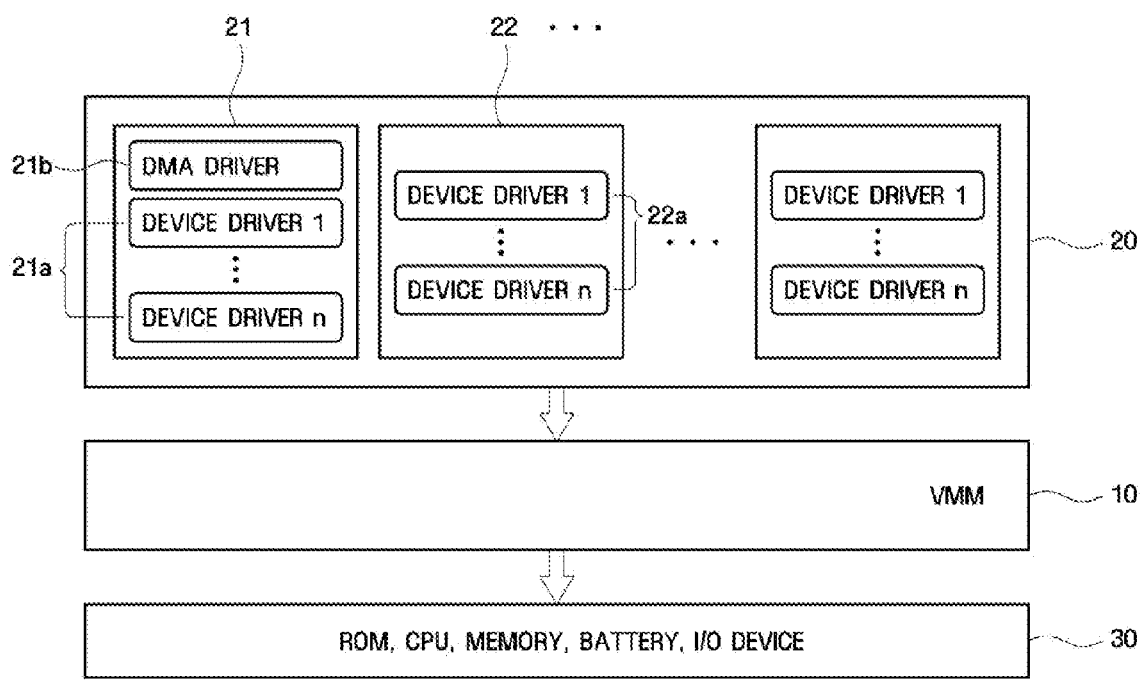
FIG. 1 is a block diagram of a related virtualization system apparatus.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals in the drawings denote like elements, and thus their description will be omitted.

Hereinafter, an apparatus and method for protecting a system in a virtualized environment according to the present invention will be described in detail with reference to the accompanying drawings.

A detailed description might be omitted when it is determined that related prior art or the detailed description of the structure may unnecessarily obscure the point of the present invention.

Figure 2:
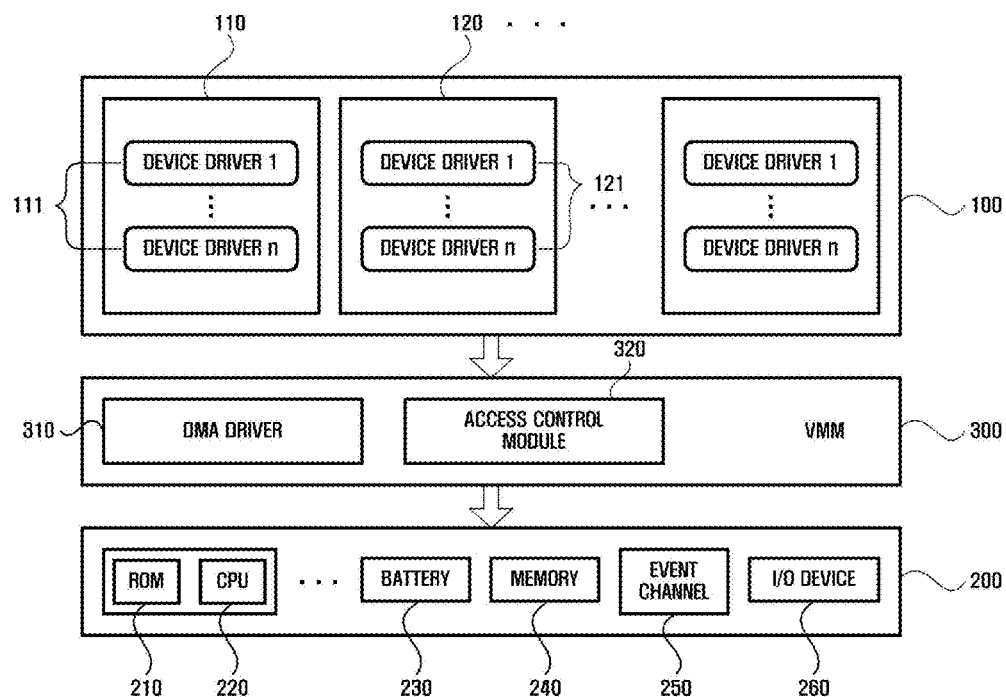
FIG. 2 is a block diagram illustrating an apparatus for protecting a system in a virtualized environment according to an exemplary embodiment of the present invention.

FIG. 2 is a block diagram of an apparatus for protecting a system in a virtualized environment according to an exemplary embodiment of the present invention.

Referring to FIG. 2, the apparatus includes a domain unit 100, a system resource unit 200, and a control unit 300.

The domain unit 100 includes a plurality of domains 110, 120, . . . , each having one or more device drivers 111, 121, or . . . . The domain unit 100 includes at least one secure domain, for example, the domain 110, and a plurality of general domains, for example, the domains 120, . . . . Here, the secure domain is highly secure, and the general domains are somewhat insecure.

The term "domain," as used herein, refers to an environment in which one or more corresponding device drivers can be executed on one or more corresponding operating systems (OS), respectively.

The system resource unit 200 forms hardware of the system. The system resource unit 200 includes a read-only memory (ROM) 210, a central processing unit (CPU) 220, a battery 230, a memory 240, an event channel 250, and an input/output (I/O) device 260.

The ROM 210 is a storage space that cannot be changed by an unauthorized user or system.

The memory 240 is a storage space in which data is stored. The memory 240 may be a non-volatile memory such as a flash memory.

The memory 240 includes a system memory and a physical memory for direct memory access (DMA) which will be described later.

The memory 240 is divided into a plurality of storage regions to classify various data information according to type and security level and store the data information accordingly. Important data information may be encrypted and stored accordingly in one of the storage regions.

Using a virtual machine monitor (VMM), the control unit 300 controls the access of the domain unit 100 to the system resource unit 200 in a virtualized environment, for example, a wireless Internet environment.

The control unit 300 includes a DMA driver 310 and an access control module 320. The access control module 320 controls the access of the domain unit 100 to the system resource unit 200 in the virtualized environment.

The DMA driver 310 is a module that performs a DMA operation.

The access control module 320 controls the access of each of the respective device drivers 111, 121, . . . of the domains 110, 120, . . . , to the system resource unit 200 through the DMA driver 310. In particular, the access control module 320 restricts the access of a malicious device driver (e.g., the device driver 121) installed in one of the insecure general domains 120, . . . (e.g., the domain 120) to an I/O space and an interrupt request (IRQ) related to the DMA driver 310. More specifically, when a device driver in one of the domains 110, 120, . . . , which is allowed to access the system resource unit 200 according to a predetermined access control policy, attempts to access the resource unit 200 through the DMA driver 310, the access control module 320 allows the device driver to access the I/O space related to the DMA driver 310. However, if the device driver attempting to access the system resource unit 200 through the DMA driver 310 is not allowed to access the system resource unit 200 according to the predetermined access control policy, the access control module 320 restricts the access of the device driver to the I/O space and the IRQ related to the DMA driver 310.

The access control module 320 sets a different option to access the system resource unit 200 for each of the domains 110, 120, . . . and controls the allocation of an I/O space and an IRQ number, which are requested by each of the device drivers 111, 121, or . . . in each of the domains 110, 120, . . . , to each of the device drivers 111, 121, or . . . based on the set option. More specifically, if the predetermined access control policy allows one of the device drivers 111, 121, . . . to access the system resource unit 200, the access control module 320 allocates an I/O space and an IRQ number requested by a device driver in the domain. If the predetermined access control policy does not allow the device driver to access the system resource unit 200, the access control module 320 does not allocate the requested I/O space and IRQ number to the device driver.

The access control module 320 restricts an excessive use of the system resource unit 200 by each of the domains 110, 120, . . . . More specifically, when one of the device drivers 111, 121, or . . . in each of the domains 110, 120, . . . uses the memory 240 of the system resource unit 200 more than an allowed quota according to the predetermined access control policy, the access control module 320 restricts the access of the device driver to the memory 240. In addition, the access control module 320 prohibits each of the domains 110, 120, . . . from forming a greater number of event channels than an allowed number according to the predetermined access control policy with another one of the domains 110, 120, . . . .

Hereinafter, a method of protecting a system in a virtualized environment according to an exemplary embodiment of the present invention will be described with reference to FIGS. 3 through 5.

Figure 3:
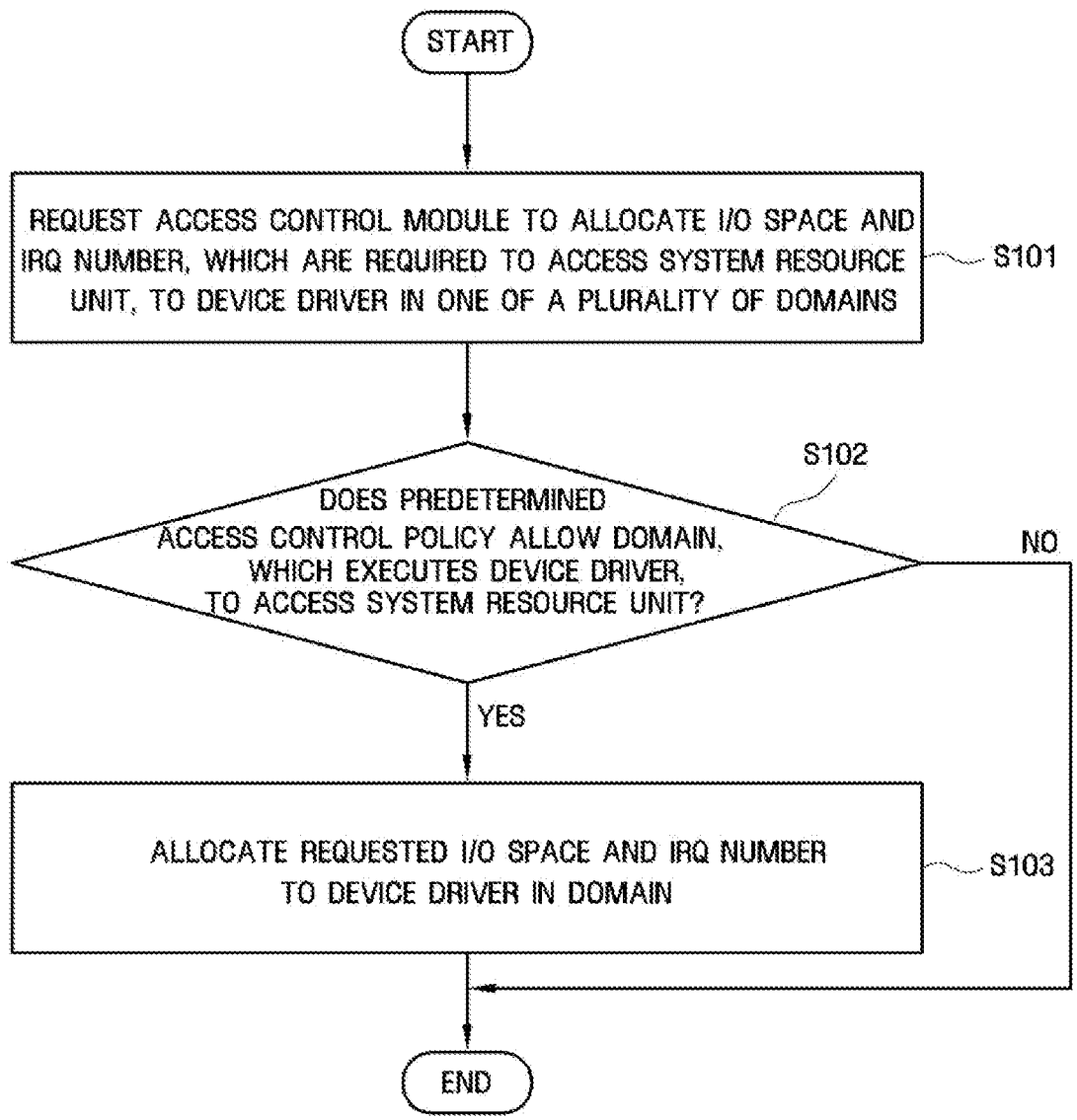
FIG. 3 is a flowchart illustrating a process of allocating an input/output (I/O) space to a device driver wherein the process is included in a method of protecting a system in a virtualized environment according to an exemplary embodiment of the present invention.

FIG. 3 is a flowchart illustrating a process of allocating an I/O space to a device driver wherein the process is included in a method of protecting a system in a virtualized environment according to an exemplary embodiment of the present invention.

Referring to FIG. 3, the access control module 320 of the control unit 300 sets a different option to access the system resource unit 200 for each of the domains 110, 120, . . . and controls the allocation of an I/O space and an IRQ number, which are requested by each of the device drivers 111, 121, or . . . in each of the domains 110, 120, . . . , to each of the device drivers 111, 121, or . . . based on the set option.

More specifically, one of the device drivers 111, 121, or . . . in one of the domains 110, 120, . . . requests the access control module 320 to allocate an I/O space required to access the system resource unit 200 (operation S101). Next, it is determined whether an access control policy determined by the access control module 320 of the control unit 300 allows the domain to access to the system resource unit 200 (operation S102). If the access control policy allows the domain to access the system resource unit 200, the access control module 320 allocates the requested I/O space and the IRQ number to the device driver in the domain (operation S103). However, if the access control policy does not allow the domain to access the system resource unit 200, the access control module 320 does not allocate the requested I/O space and IRQ number to the device driver in the domain.

Figure 4:
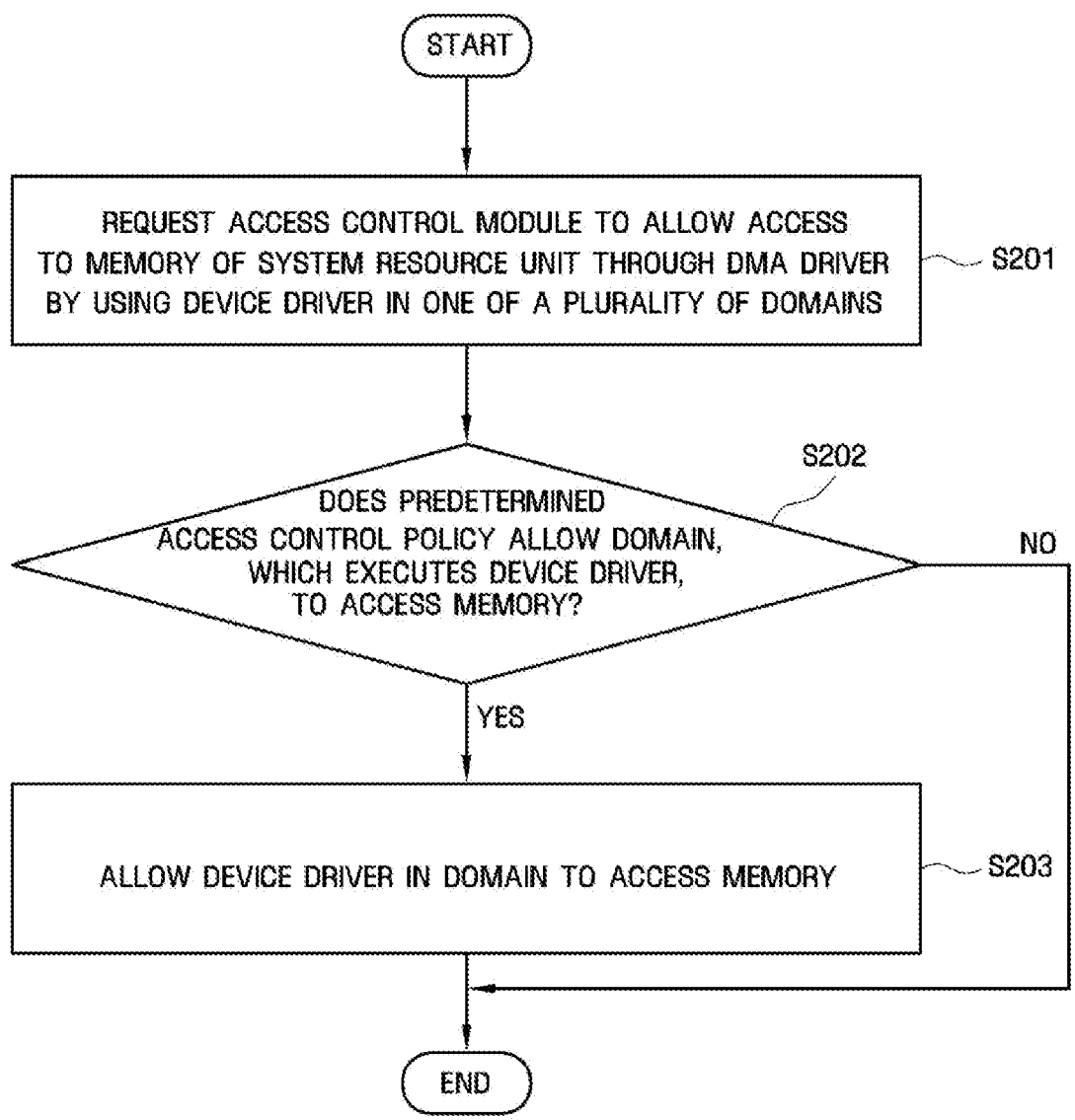
FIG. 4 is a flowchart illustrating a process of controlling the access of a device driver to a system memory through a direct memory access (DMA) driver wherein the process is included in the system protection method according to an exemplary embodiment of the present invention.

FIG. 4 is a flowchart illustrating a process of controlling the access of a device driver to a system memory through the DMA driver 310 wherein the process is included in the system protection method according to an exemplary embodiment of the present invention.

Referring to FIG. 4, the access control module 320 of the control unit 300 controls the access of each of the device drivers 111, 121, or . . . in each of the domains 110, 120, . . . to the system resource unit 200 through the DMA driver 310.

More specifically, one of the device driver 111, 121, or . . . in one of the domains 110, 120, . . . requests the control access module 320 to allow it access to the memory 240 of the system resource unit 200 through the DMA driver 310 (operation S201). Next, it is determined whether the access control policy allows the domain, which executes the device driver, to access the memory 240 (operation S202). If the access control policy allows the domain to access the memory 240, the access control module 320 allows the device driver to access the memory 240 (operation S203). However, if the access control policy does not allow the domain to access the memory 240, the access control module 320 restricts the access of the device driver to the memory 240.

Figure 5:
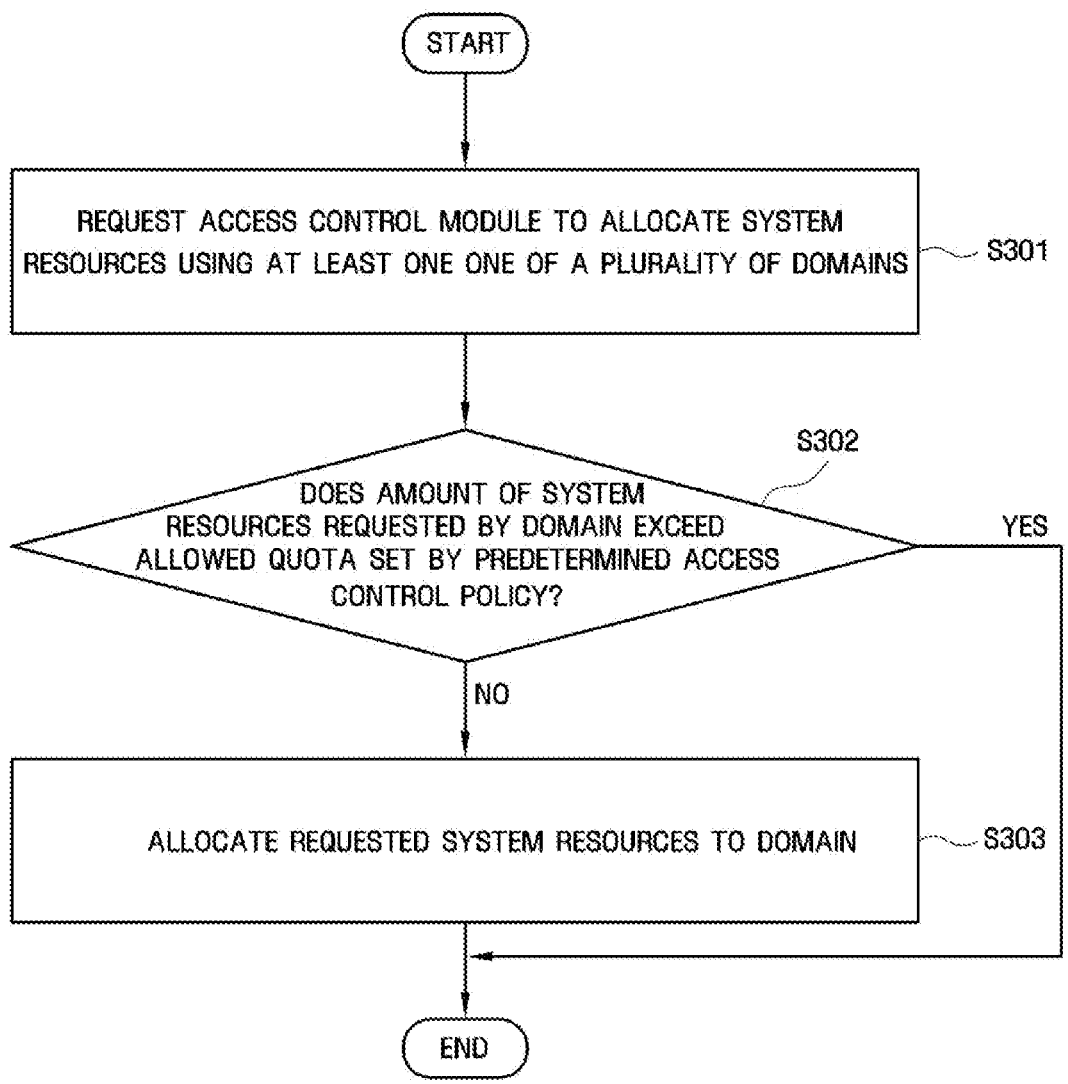
FIG. 5 is a flowchart illustrating a process of controlling the access of a domain to system resources wherein the process is included in the system protection method according to an exemplary embodiment of the present invention.

FIG. 5 is a flowchart illustrating a process of controlling the access of a domain to system resources wherein the process is included in the system protection method according to an exemplary embodiment of the present invention.

Referring to FIG. 5, the access control module 320 restricts an excessive use of the system resource unit 200 by each of the domains 110, 120, . . . .

More specifically, at least one of the domains 110, 120, . . . requests the access control module 320 to allocate system resources (operation S301). Next, it is determined whether the amount of system resources requested by the domain exceeds an allowed quota set by the access control policy (operation S302). If the amount of system resources requested by the domain is less than the allowed quota, the access control module 320 allows the allocation of the requested system resources to the domain (operation S303). However, if the amount of system resources requested by the domain exceeds the allowed quota, the access control module 320 does not allow the allocation of the system resources to the domain. For example, when one of the device drivers 111, 121, or . . . in each of the domains 110, 120, . . . uses the memory 240 more than an allowed quota, the access control module 320 restricts the access of the domain to the memory 240. In addition, the access control module 320 prohibits each of the domains 110, 120, . . . to form a greater number of event channels than an allowed number with another one of the domains 110, 120, . . . .

As described above, in an apparatus and method for protecting a system in a virtualized environment, system resources can be protected from malicious access by, for example, malware, and system failures can be solved. Therefore, safe security services can be provided.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for protecting a system in a virtualized environment, the apparatus comprising:
   a domain unit comprising a plurality of domains, each of the plurality of domains including a plurality of device drivers;
   a system resource unit; and
   a control unit comprising a direct memory access (DMA) driver, and an access control module which controls an access of the domain unit to the system resource unit in the virtualized environment through the DMA driver,
   wherein the control unit controls the access of the domain unit to the system resource using a virtual machine monitor (VMM), and
   wherein each of the plurality of domains is assigned its own option to access the system resource.

2. The apparatus of claim 1, wherein the plurality of domains comprises at least one secure domain.

3. The apparatus of claim 1, wherein the system resource unit comprises at least one of a system memory, a physical memory for the DMA driver, and an event channel between at least two domains of the plurality of domains.

4. The apparatus of claim 1, wherein the control unit performs a control operation using the virtual machine monitor.

5. The apparatus of claim 1, wherein the access control module controls an access of each of the device drivers in each of the plurality of domains to the system resource unit through the DMA driver.

6. The apparatus of claim 5, wherein the access control module restricts an access of a malicious device driver installed in any one of insecure domains among the plurality of domains to an input/output (I/O) space and an interrupt request (IRQ) related to the DMA driver.

7. The apparatus of claim 1, wherein the access control module controls the allocation of an I/O space and an IRQ number related to the DMA driver, which are requested by a device driver in one of the plurality of domains, to the device driver based on the set option.

8. The apparatus of claim 7, wherein the access control module allocates the requested I/O space and the requested IRQ number to the device driver in one of the plurality of domains if the device driver is allowed to access the system resource unit, and does not allocate the requested I/O space and IRQ number to the device driver in the one of the plurality of domains if the device driver is not allowed to access the system resource unit.

9. The apparatus of claim 1, wherein the access control module restricts excessive uses of the system resource unit by the plurality of domains.

10. The apparatus of claim 9, wherein the access control module restricts the access of a device driver in one of the plurality of domains to a memory of the system resource unit if the device driver uses the memory more than an allowed quota.

11. The apparatus of claim 9, wherein the access control module prohibits each domain of the plurality of domains from forming a number of event channels greater than an allowed number with another domain of the plurality of domains.

12. A method of protecting a system in a virtualized environment, the method comprising:
  requesting an access control module of a virtual machine monitor (VMM) to allocate an I/O space and an interrupt request (IRQ) number related to a direct memory access (DMA) driver, which are required to access a system resource unit, to a device driver in one of a plurality of domains;
  determining whether a predetermined access control policy allows the one of the plurality of domains executing the device driver to access the system resource unit; and
  allocating the requested I/O space and the requested IRQ number to the device driver in the one of the plurality of domains if the predetermined access control policy allows the one of the plurality of domains to access the system resource unit, and not allocating the requested I/O space and the requested IRQ number to the device driver in one of the plurality of domains if the predetermined access control policy does not allow the one of the plurality of domains to access the system resource unit;
  wherein the system resource unit is implemented as hardware.

13. The method of claim 12, wherein the access control policy is determined by the access control module included in a virtual machine monitor (VMM).

14. A method of protecting a system in a virtualized environment, the method comprising:
  requesting, by a device driver in one of a plurality of domains, an access control module located in a virtual machine monitor to allow access to a memory of a system resource unit through a direct memory access (DMA) driver located in the virtual machine monitor;
  determining whether a predetermined access control policy allows the one of the plurality of domains executing the device driver to access the memory; and
  allowing the device driver in the one of the plurality of domains to access the memory if the predetermined access control policy allows the one of the plurality of domains to access the memory, and not allowing the device driver in the one of the plurality of domains to access the memory if the predetermined access control policy does not allow the one of the plurality of domains to access the memory;
  wherein the system resource unit is implemented as hardware.

15. A method of protecting a system in a virtualized environment, the method comprising:
  requesting, by a domain, through a direct memory access (DMA) driver located in a virtual machine monitor, an access control module to allocate system resources using one of a plurality of domains;
  determining whether an amount of system resources requested by the domain exceeds an allowed quota set by a predetermined access control policy; and
  allowing an allocation of the requested system resources to the one of the plurality of domains if the amount of system resources requested by the one of the plurality of domains is less than the allowed quota, and not allowing the allocation of the requested system resources to the one of the plurality of domains if the amount of system resources requested by the one of the plurality of domains exceeds the allowed quota;
  wherein the system resources are allocated to access a system resource unit which is implemented as hardware, and
  wherein the access control module is located in the virtual machine monitor.

16. The method of claim 15, wherein the amount of system resources requested by the one of the plurality of domains comprises an amount of memory to be used.

17. The method of claim 15, wherein the amount of system resources requested by the one of the plurality of domains comprises a number of event channels to be formed between at least two domains of the plurality of domains.

* * * * *